(12) United States Patent
Olkin et al.

(10) Patent No.: US 6,584,564 B2
(45) Date of Patent: Jun. 24, 2003

(54) SECURE E-MAIL SYSTEM

(75) Inventors: Terry M. Olkin, Redwood Shores, CA (US); Jahanshah Moreh, Los Angeles, CA (US)

(73) Assignee: Sigaba Corporation, San Mateo, CA (US)

( * ) Notice: Subject to any disclaimer, the term of this patent is extended or adjusted under 35 U.S.C. 154(b) by 0 days.

(21) Appl. No.: 09/558,691

(22) Filed: Apr. 25, 2000

(65) Prior Publication Data

US 2003/0046533 A1 Mar. 6, 2003

(51) Int. Cl.[7] .............................. H04L 9/00; G06F 12/14
(52) U.S. Cl. ..................... 713/152; 713/151; 713/202
(58) Field of Search ................. 713/151–152, 713/713, 200, 202

(56) References Cited

U.S. PATENT DOCUMENTS

| | | | | |
|---|---|---|---|---|
| 5,748,735 A | * | 5/1998 | Ganesan .................... | 713/165 |
| 5,848,161 A | * | 12/1998 | Luneau et al. ............... | 705/78 |
| 6,023,700 A | * | 2/2000 | Owens et al. ................ | 707/10 |
| 6,230,156 B1 | * | 5/2001 | Hussey ....................... | 707/10 |
| 6,289,105 B1 | * | 9/2001 | Murota ....................... | 380/286 |
| 6,442,686 B1 | * | 8/2002 | McArdle et al. ............. | 713/151 |

* cited by examiner

Primary Examiner—Gilberto Barron
Assistant Examiner—Kambiz Zand
(74) Attorney, Agent, or Firm—Raymond E. Roberts; IPLO Intellectual Property Law Offices

(57) ABSTRACT

A secure e-mail system (10) permitting a sender (12) to send a secure e-mail (14) to one or more receivers (16). The sender (12) employs a sending unit (18) having a software module (26) to compose the secure e-mail (14), to send data about it to a security server (24), to receive back from that security server (24) a messageKey (102e) for encrypting the secure e-mail (14), and for sending it conventionally to an e-mail server (22). The receivers (16) employ receiving units (20) also having software modules (26) to receive the secure e-mail (14), to send data about it to the security server (24), and to receive back from the security server (24) the messageKey (102e) for decrypting the secure e-mail (14). The security server (24) stores a user id (102a) and password (102b) for the sender (12) and the receivers (16); a messageId (104a), a sealSalt (104j), and the messageKey (104g) for the secure e-mail (14); and a receiver address (106b) in a database (100). Using the database (100) the security server (24) authenticates the sender (12) and the receiver (16) and validates the secure e-mail (14).

20 Claims, 9 Drawing Sheets

FIG. 6a: Basic user information table (Users)

| Column Name | Type | Description |
|---|---|---|
| UserId | integer | Internal user identifier |
| Password | raw | Hash of user's password |
| Salt | integer | Salt added to password before hash |
| Status | varchar | User's current registration/usage status |

FIG. 6b: Sent messages table (SentMail)

| Column Name | Type | Description |
|---|---|---|
| MessageId | integer | Unique email identifier |
| SenderId | integer | Internal sender identifier (ref to Users) |
| DateSent | date | Time and date record entered |
| NumRecipients | integer | Number of users message was sent to |
| MessageKey | raw | Key used to encrypt/decrypt message |
| MaxDeliveries | integer | Maximum times key is delivered to each user |
| Expiration | date | Time after which message should not be delivered |
| SealSalt | integer | Secret salt added to hash to form seal |
| Subject | varchar | The subject of the message |
| LastRead | date | The date the message was last read |
| DeliverAfter | date | The date after which the message may be read |

FIG. 6c: Email destinations (Receivers)

| Column Name | Type | Description |
|---|---|---|
| MessageId | integer | Email message's identifier (ref to SentMail) |
| ReceiverAddr | integer | Receiver's e-mail address |
| FirstRequest | date | Time the receiver first attempts to read |
| NumRequests | integer | Number of times receiver requested to read |

FIG. 6d: Alternate user identities (UserAliases)

| Column Name | Type | Description |
| --- | --- | --- |
| EmailAddress | varchar | Alternate email address |
| UserId | integer | Reference to Users table. |

FIG. 6e: Distribution list master (Distributions)

| Column Name | Type | Description |
| --- | --- | --- |
| DistributionId | integer | Unique list identifier |
| OwnerId | integer | User who owns list (ref to Users). |
| ListName | varchar | Email address of this list |

FIG. 6f: Distribution list members (ListMembers)

| Column Name | Type | Description |
| --- | --- | --- |
| DistributionId | integer | Reference to Distributions |
| MemberAddress | varchar | Name of alias on the list |
| Administrate | char | Y=member can update list, N=cannot |

SECURE E-MAIL SYSTEM

TECHNICAL FIELD

The present invention relates generally to providing security for communications in networks such as the Internet, and more particularly to the secure communication of e-mail messages within such networks.

BACKGROUND ART

Virtually every user of electronic communications mediums has at some time or another paused to wonder about the security of messages within those systems. Various reasons exist for causing concern in this regard, probably ones far too numerous to cover here, but a few examples include having to depend on complex technologies, having to rely on unknown and possibly untrustworthy intermediaries, and the increasing anonymity in our electronic communications due to the distances which messages may travel and the masses of people which we may now reach.

Existing communications systems have had a long time to establish security mechanisms and to build up trust in them by their users. In the United States our conventional postal mail is a good example. We deposit our posted letters into a receptacle which is often very physically secure. Our letters are then picked up, sorted, transported, and ultimately delivered to a similar receptacle for retrieval by their recipients. Between the receptacles of a sender and a receiver the persons handling a letter are part of a single organization (at least intra-nationally) that is well known to us and considered to be highly trustworthy. Even on the rare occasions when the security of our postal system does fail, it has mechanisms to quickly detect and to correct this.

Unfortunately, most of us do not have anywhere near a similar degree of trust in the security of e-mail as it passes between senders and receivers in our modern electronic communications mediums. We generally trust only in our ability to maintain the security of our sending and receiving "receptacles" for e-mail messages, because they are personal computers (PCs), workstations, Internet appliances, etc. which are within our personal physical control. We also typically appreciate that we have much less control over what goes on in the electronic medium between such receptacles. Any number of miscreants may copy and receive an unsecured e-mail without its sender and receivers being any the wiser. Even worse, in many cases, an e-mail message can be maliciously altered in transit, fraudulently concocted entirely, or later simply repudiated.

The problem of e-mail security is a severe one and is already receiving considerable attention. Legal mechanisms have and are more strongly being put into place to punish and to discourage security breaches, but the very beneficial ability of e-mail to travel so far and so swiftly also means that it may cross legal boundaries, potentially hampering such legal efforts and definitely creating a crisis in user confidence.

Old technologies have been revived and extended for use in the new electronic medium, often variations of ones long used in combination with conventional postal systems to obtain heightened security there. Thus we are seeing a resurgence of interest in and the use of cryptography.

Many of the existing systems for e-mail security are unwieldy, not well trusted, or both. The very electronic systems which have made e-mail possible and efficient have already made many conventional cryptographic systems obsolete, or at least highly suspect. Modern computer systems have the ability to perform staggering numbers of tedious operations in a massively parallel manner, and many strong cryptographic systems of the past have now been shown to be no longer reliable.

New systems have emerged, however. The last 25 years has seen the introduction, rapid development, and more recently the application in electronic communications of public-key and private-key based systems commonly termed a "public key infrastructure" (PKI). These are presently quite popular, but perhaps prematurely and unduly.

The foundation of the PKI system is generally attributed to work done by Ron Rivest, Adi Shamir, and Leonard Adleman at the Massachusetts Institute of Technology in the mid 1970's. The result of that work, commonly known as the RSA algorithm, is a cryptosystem wherein both a public and a private key are assigned to a principal. The public key is revealed to all, but the private key is kept secret. The keys used are both large prime numbers, often hundreds of digits long, and the inherent strength of the RSA algorithm lies in the difficulty in mathematically factoring large numbers.

To send a message securely the message is encrypted using the public key of its intended recipient (here the principal). The message can then only be decrypted and read by the recipient by using their private key. In this simple scenario anyone can send messages to the recipient which only the recipient can read.

A highly beneficial feature of the PKI approach is that a sender can also be a principal and can send a message which only they could have sent. i.e., a non-repudiable message. For this the sender encrypts a message (often only a part of what will be a larger message) using their private key. A recipient then knows that the purported or disputed sender is the true sender of the message, since only using that sender's public key will work to decrypt the message.

In practice, the sender and the receiver often are both principals in PKI systems. The sender encrypts a "signature" using their private key, then embeds this signature into their message, and then encrypts the result using the recipient's public key. The message then is secure to all but the recipient. Only the recipient can decrypt the message generally, using their private key, and once that is done the recipient may further use the sender's public key to specifically decrypt the signature. In this manner the receiver may rest assured that the sender is the true, non-repudiable, source of the signature (and implicitly the entire message; but this works more securely still if the signature uniquely includes something like a hash of the general message).

As the presence of the term "infrastructure" in PKI implies, however, this popular cryptographic system requires a considerable support system. An authority typically is needed to issue and particularly to certify the keys (usually both, as a matter of practicality), since PKI relies on public keys. The public keys must also be published, so that those wishing to send a message can determine keys for intended recipients. These tasks are usually handled by a "certification authority." Unfortunately, as the marketplace in our competitive society is now demonstrating, this can lead to a plurality of certification authorities all vying for acceptance and thoroughly confusing the potential users.

Of course public and private key systems are possible without the use of a certification authority, say, among small groups wishing to carry out secure communications among themselves and where repudiation is not a concern. But as the very negative reaction by government to initial publication of and about the RSA algorithm has aptly demonstrated, true, unbridled security can be perceived as a threat to government ability to protect society. While it is probably now too late for governments to fully suppress the use of ultra-strong cryptography, it also follows that governments will be more receptive to cryptosystems that can be opened when truly appropriate (often termed "key escrow" systems).

PKI also has some problems with regard to usability and efficiency. Since the keys are quite large, usually well beyond the capability of an average human to memorize, they are awkward to work with. Machine based storage and usage mechanisms usually must be resorted to just to handle the keys. This is a severe impediment to mobile use across multiple systems and to recovering after erasure from volatile memory, and it creates a whole host of additional problems related to protecting what effectively becomes a physical key needed to contain the private key. A receiver based key system, such as PKI, is also unwieldy in some situations. For example, if there are multiple intended recipients, a public key for each must be obtained and used to separately encrypt each message copy. This can encompass quite a severe computational burden as a list of intended e-mail recipients grows in number.

Accordingly, prior art cryptosystems and PKI systems provide many benefits, but even they are not perfect in all regards. It is increasingly becoming apparent that it is now desirable to improve on, augment, or even replace such systems.

DISCLOSURE OF INVENTION

Accordingly, it is an object of the present invention to provide a security protection scheme for e-mail messages as they are communicated on networks.

Another object of the invention is to provide a security protection scheme which minimally burdens its users.

And, another object of the invention is to provide a security protection scheme which flexibly may be embodied to operate with a wide range of e-mail applications, particularly including conventional, stand-alone type e-mail applications as well as newer web-based e-mail applications.

Briefly, one preferred embodiment of the present invention is a method for sending a secure e-mail. An e-mail message is composed by a sender, with the message including a body field and at least one receiver field containing receiver ids for intended receivers. A sender id, a sender password, and the receiver ids are provided to a security server, and a message key and a message id which is unique for the e-mail message are then received back from the security server. The body field of the e-mail message is encrypted based on the message key and the message id is enclosed to form the secure e-mail. The secure e-mail is then mailed in conventional manner to the receivers. And the message id, message key, and receiver ids are stored at the security server, to allow it to provide the message key to the receivers so that they may decrypt and read the secure e-mail.

Briefly, another preferred embodiment of the present invention is a method for receiving a secure e-mail. The secure e-mail is accepted by a receiver, wherein the secure e-mail includes a body field that is encrypted and a message id that uniquely identifies the secure e-mail. The message id as well as a receiver id and a receiver password for the receiver are provided to a security server, and a message key is received back from the security server. The secure e-mail is then decrypted based on the message key, to form an e-mail message which is readable by the receiver.

Briefly, still another preferred embodiment of the present invention is a system for communicating an e-mail message securely between a sender and a receiver. A sending unit is provided that composes the e-mail message for the sender, wherein the e-mail message includes a body field and a receiver field containing a receiver id representing the receiver. The sending unit includes a logic that provides a sender id, a sender password, and the receiver id to a security server. The security server includes a logic that replies to the sending unit with a message id, which is unique for the e-mail message, and a message key. The security server further includes a logic that stores the message id, message key, and receiver id. The sending unit further includes a logic that encrypts the e-mail message based on the message key and encloses the message id to form a secure e-mail. The sending unit yet further includes a logic that e-mails the secure e-mail in conventional manner to the receiver. A receiving unit is provided that accepts the secure e-mail. The receiving unit includes a logic that provides the message id, receiver id and a receiver password to the security server. The security server yet further includes a logic that replies to the receiving unit with the message key for the secure e-mail. And the security server still further includes a logic that decrypts the secure e-mail based on the message key into the e-mail message such that it is readable by the receiver.

An advantage of the present invention is that it provides for highly secure e-mail communications. The invention protects e-mail between senders and receivers by using a robust manner of encryption. It further permits a high degree of e-mail tampering detection, as well as non-repudiation by e-mail senders. The invention provides all of its function without ever needing to inspect the actual email message.

Another advantage of the invention is that it minimally burdens those using it. It does not require complicated installation and configuration by its users, being either pre-installed or rapidly user-installable with defaults provided for all configuration options. It employs a simple registration scheme which permits prompt use after registration and any installation are complete. Because of these and other features, the target recipients of secure e-mails created using the invention need not be pre-registered. A sender may create and send a secure e-mail, and the invention can detect which intended receivers are not registered. The invention can then advise those intended receivers, via conventional e-mail or other means, that they are about to receive a secure e-mail and how to prepare for such.

Another advantage of the invention is that its core functionality does not rely on public-private key encryption schemes, although such may be incorporated in some elements of the invention to make it convenient and also more secure in some ancillary respects.

And, another advantage of the invention is that, unlike a public/private key system, the key to the email message need not be encrypted once for every recipient. Thus, the number of encryptions performed is independent of the number of receivers.

These and other objects and advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF THE DRAWINGS

The purposes and advantages of the present invention will be apparent from the following detailed description in conjunction with the appended drawings in which:

FIGS. 2a–c depict e-mail forms which may be used by the invention, wherein FIG. 2a is a conventional send form, FIG. 2b is a send form which is modified to work with the invention, and FIG. 2c is a conventional receive form;

FIGS. 6a–e are the tables in FIG. 5 with descriptions for the fields used therein, wherein FIG. 6a is of user data, FIG. 6b is of message data, FIG. 6c is of destination data, FIG. 6d is of alias data for users, FIG. 6e is of optional distribution list data, and FIG. 6f is of member data for such distribution lists;

BEST MODE FOR CARRYING OUT THE INVENTION

Figure 1:
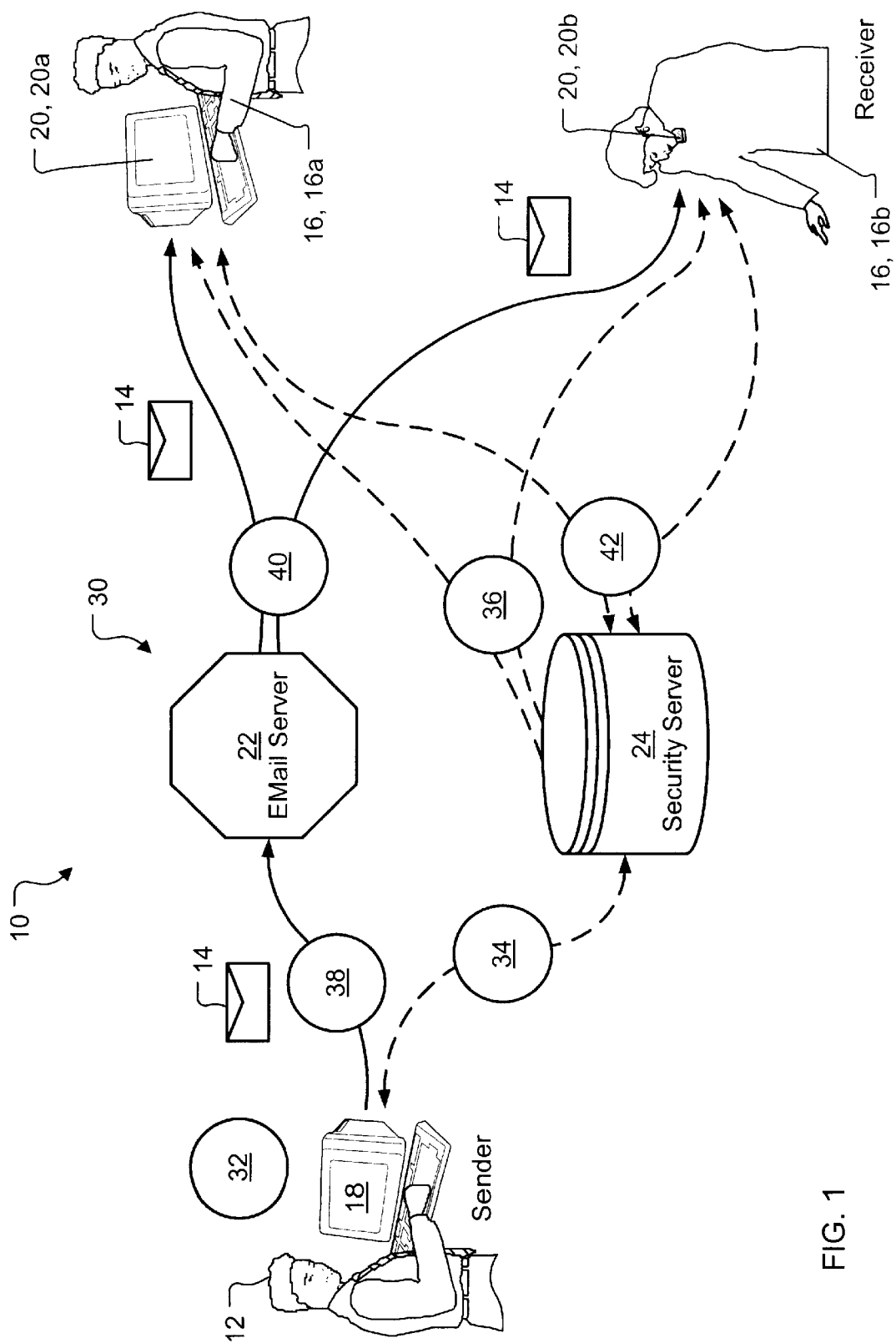
FIG. 1 is a schematic overview diagram generally depicting information flow in the inventive secure e-mail system.

A preferred embodiment of the present invention is a system for secure e-mail communications. As illustrated in the various drawings herein, and particularly in the view of FIG. 1, this preferred embodiment of the inventive device is depicted by the general reference character 10.

FIG. 1 is a schematic overview diagram generally depicting information flow in the inventive secure e-mail system 10. A sender 12 uses the secure e-mail system 10 to send a secure e-mail 14 to one or more receivers 16. To accomplish this the sender 12 employs a suitable sending unit 18 to create and send the secure e-mail 14, and the receivers 16 then employ suitable receiving units 20 to receive and view the secure e-mail 14. The secure e-mail system 10 further includes an e-mail server 22, which is essentially conventional, and a security server 24, which along with software modules 26 (FIG. 3) in the sending units 18 and the receiving units 20 constitute the primary new elements in the secure e-mail system 10.

The sending units 18 and the receiving units 20 are suitable combinations of hardware and software. They may be either similar or different hardware, and in FIG. 1 this is emphasized by depicting the sending unit 18 and a first receiving unit 20a as being personal computers (PCs), and the second receiving unit 20b as being an Internet appliance.

The sending unit 18 must have sending capability, and in many cases it will also be utilized to compose the secure e-mail 14. However, composition capability is not necessarily a requirement and, for example, an Internet appliance such as a cell-phone with pre-stored standard messages may also be used. The receiving units 20 must be capable of receiving the secure e-mail 14 and they may, optionally, also have message composition and other capabilities.

With respect to the software required, each sending unit 18 and receiving unit 20 will need suitable e-mail type applications and suitable instances of the software modules 26. The e-mail type applications may be conventional e-mail applications, or they may be browsers having integrated e-mail capability, or they may be e-mail applets operating in conventional browsers. The software modules 26 will be described in more detail presently, but it can be noted here that these can be installed almost contemporaneously with their first use in a sending unit 18 or a receiving unit 20.

In FIG. 1 both a first receiver 16a and a second receiver 16b are depicted to emphasize that the secure e-mail system 10 may be used to send to multiple receivers 16. Thus, common e-mail addressing conventions such as "To . . . ," "Cc . . . ," "Bcc . . . ," etc. may be used, and the secure e-mail system 10 may also be used to concurrently send to lists of multiple receivers 16.

For the following overview discussion it is presumed that the sender 12 and the first receiver 16a are registered with the security server 24 and that the sending unit 18 and the first receiving unit 20a have been suitably provisioned with appropriate instances of the software modules 26 to operate in their respective roles in the secure e-mail system 10. It is further presumed that the second receiver 16b has not yet registered with the security server 24 and that the second receiving unit 20b has not yet been provisioned to operate with the secure e-mail system 10.

The overview of FIG. 1 also depicts the major stages of sending a secure e-mail 14 in a network environment 30, such as the current Internet. In a stage 32 the sender 12 decides to send the secure e-mail 14. An e-mail message is therefore composed in some manner, conventional or otherwise.

In a stage 34, rather than use a "Send" command the sender 12 instead uses a "Send Securely" command to request transmission of the secure e-mail 14. However, rather than transmit the unsecured e-mail message immediately to the e-mail server 22, the sending unit 18 first contacts the security server 24 and provides it with various data items (the respective data items used in this stage and others are described presently). The security server 24 then authenticates the sender 12 and replies to the sending unit 18 with a unique message key and id for the present secure e-mail 14. The security server 24 also logs various data items for this transaction which may be used later. Using the message key, the sending unit 18 now encrypts the secure e-mail 14. The message body, encrypted or otherwise, is never sent to the security server 24.

In a stage 36 the security server 24 determines whether the receivers 16 are registered. If so, as is the case here only for the first receiver 16a, this stage is finished for such receivers 16. However, if a receiver 16 is not registered, as is the case here for the second receiver 16b, registration is then attempted. For this the security server 24 sends an e-mail message to the second receiver 16b, informing him or her that an encrypted message will be arriving soon and that he or she will need to register in order to read it. The second receiver 16b can then follow a universal resource locator (URL), which is included in the email sent by the security server 24, to a routine for registering with the security server 24. The second receiving unit 20b may already have the necessary software module 26 for receiving and decrypting the secure e-mail 14, or such may be provided as part of the registration process. Once the second receiver 16b is registered and the second receiving unit 20b has the necessary software module 26 installed, this stage is complete.

In a stage 38 the sending unit 18 sends the now encrypted secure e-mail 14. This can be essentially transparent or seamless to the sender 12, being handled in the software module 26 of the sending unit 18 by passing the now encrypted secure e-mail 14 to a conventional e-mail type application and automatically providing a suitable "Send"

command. The secure e-mail 14 then proceeds in conventional manner to the e-mail server 22, arriving in the inbox of each of the target receivers 16. Notably, the body of the secure e-mail 14 is encrypted during the entire time that it is passing between the sending unit 18 and the receiving units 20. Optionally, the subject may also be encrypted during this time.

In a stage 40 the secure e-mail 14 arrives in the inbox of each receiver 16. When a receiver 16 opens the secure e-mail 14, using their receiving unit 20, the software module 26 for the receiving unit 20 detects that the secure e-mail 14 is encrypted. Depending upon its configuration, the software module 26 can then prompt the receiver 16 for a password or use one already known to it.

Finally, in a stage 42 the receiving unit 20 contacts the security server 24 and provides it with the message id and data for the receiver 16 (including their password). Assuming that the receiver 16 is an authorized recipient (as determined by the list of recipients in the original message), the security server 24 provides the message key to the receiving unit 20. Optionally, the security server 24 can also provide an indication of whether the secure e-mail 14 was altered in any way. With the message key the receiving unit 20 decrypts the secure e-mail 14 and the receiver 16 is able to read it.

Figure 2A:
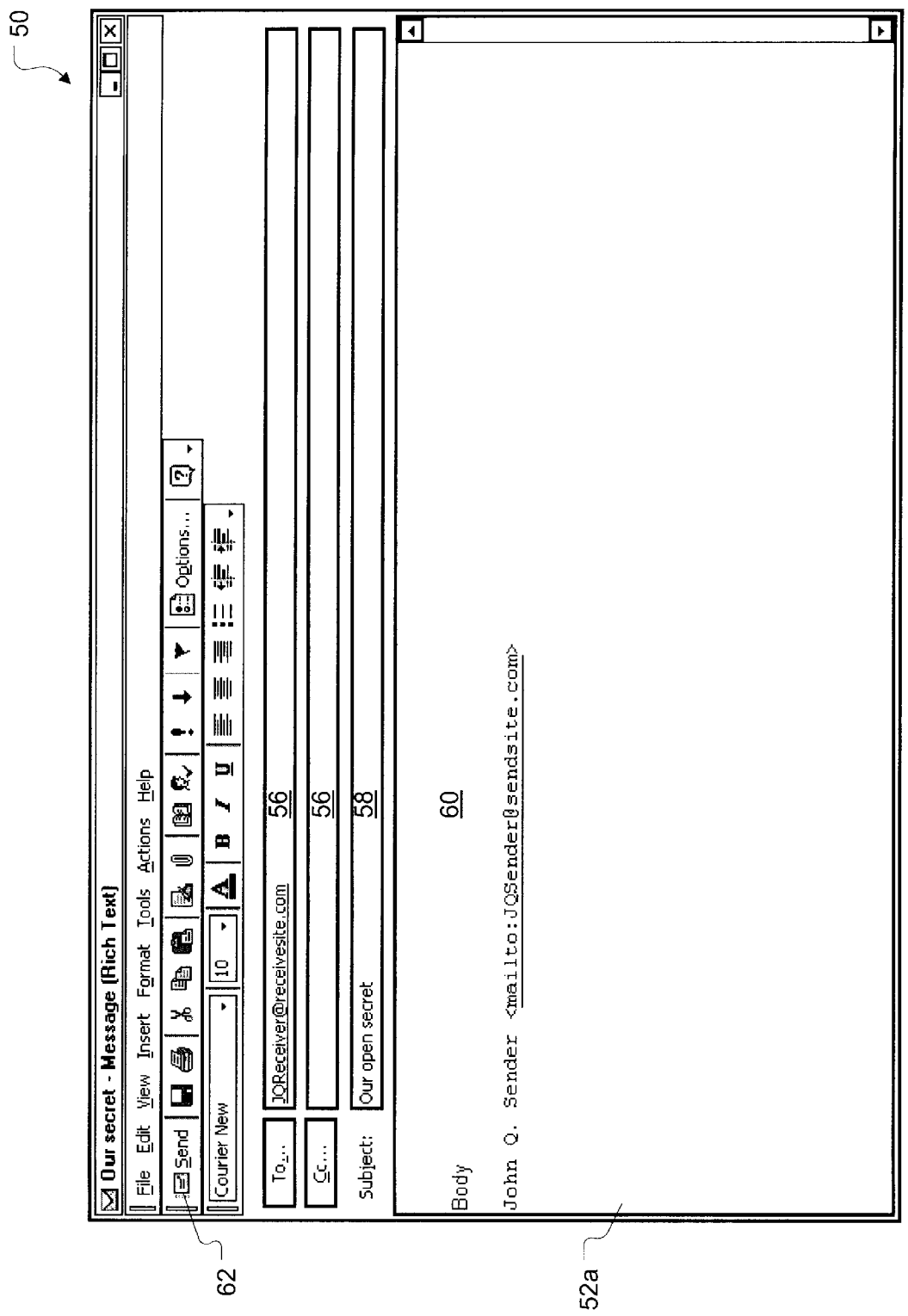
Figure 2B:
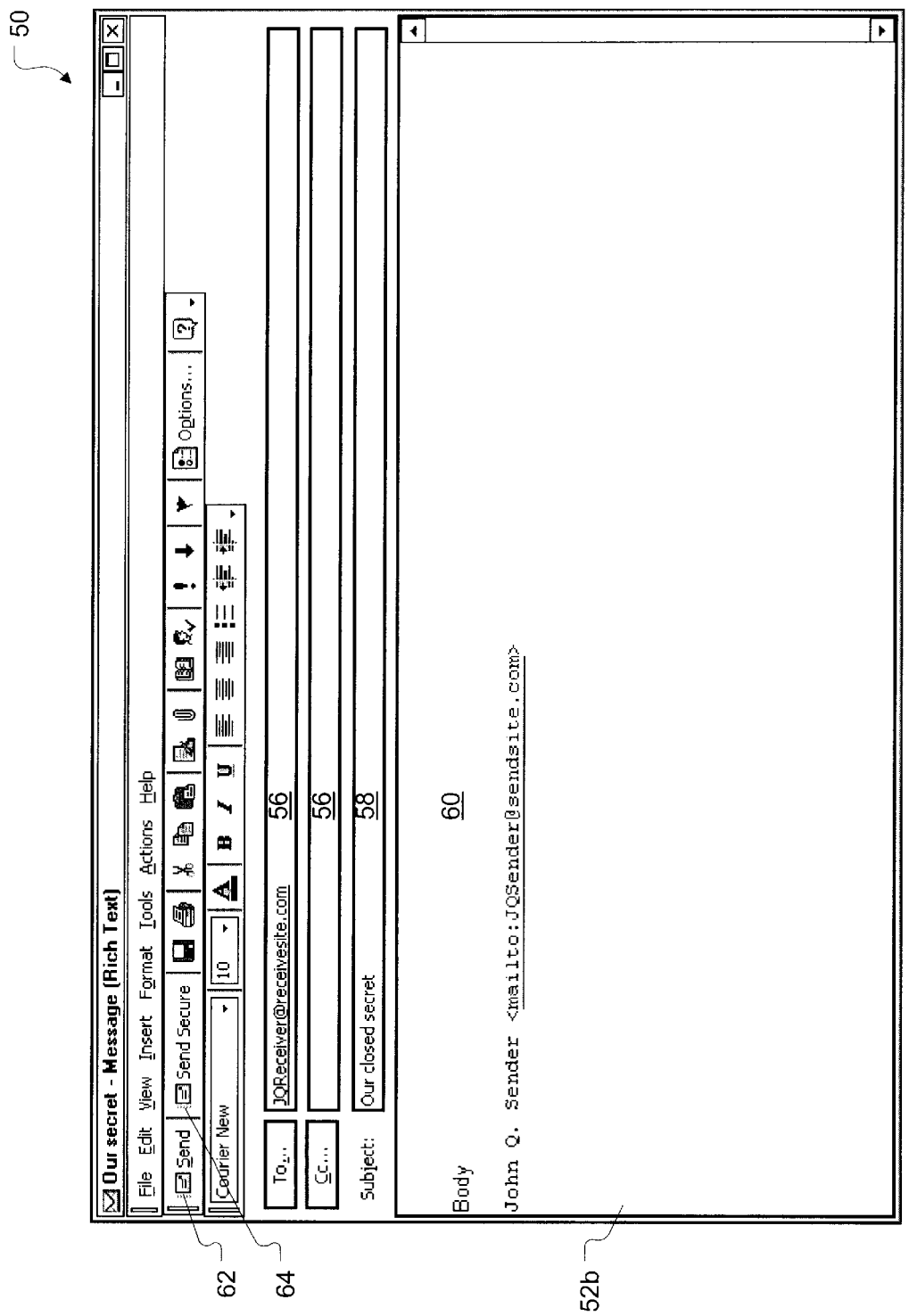
Figure 2C:
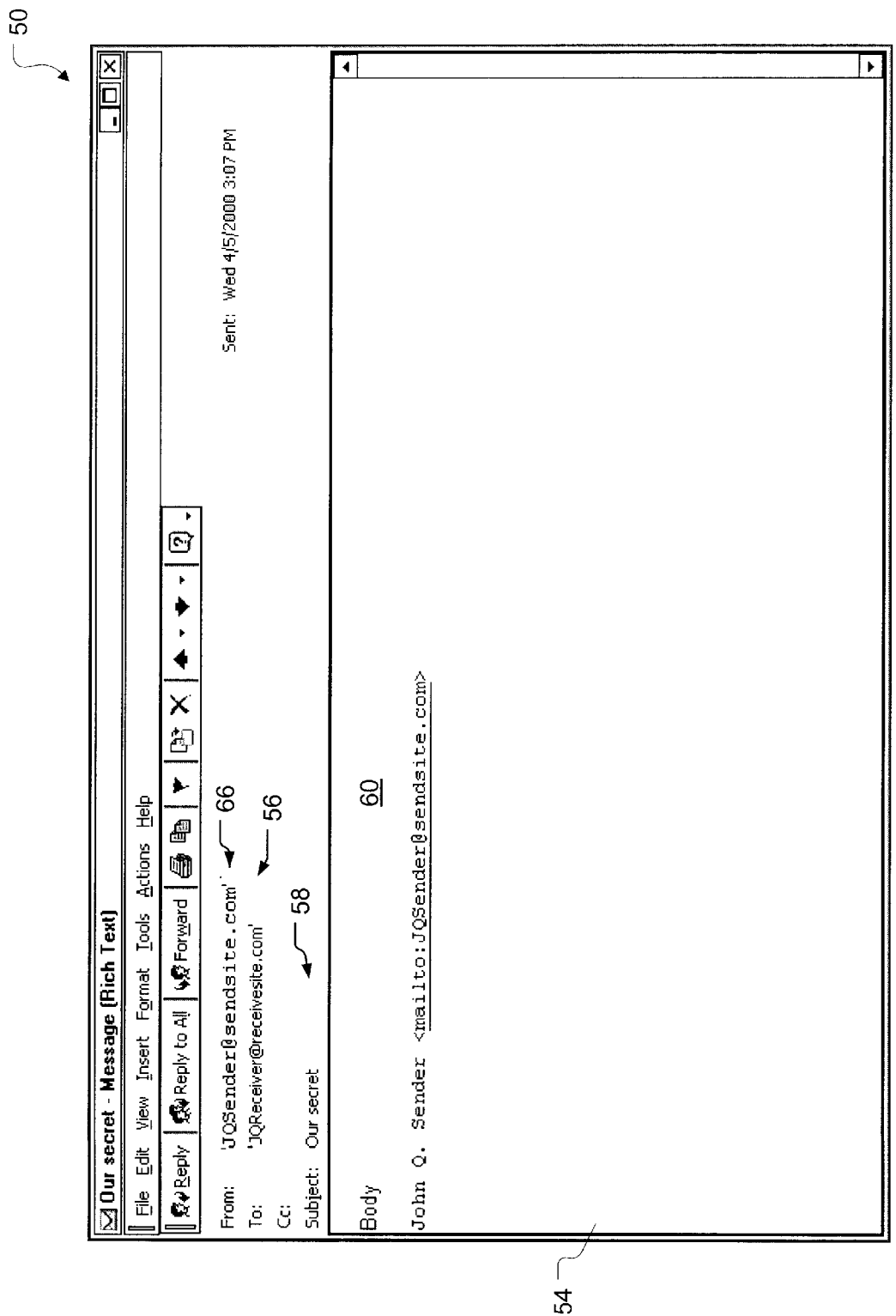

FIGS. 2a–c depict e-mail forms 50 which the secure e-mail system 10 may use. FIG. 2a is a conventional send form 52a. FIG. 2b is a send form 52b which is essentially the same as send form 52a, but which is modified to work with the secure e-mail system 10. And FIG. 2c is a conventional receive form 54 which may be used with the secure e-mail system 10.

The send forms 52a–b both include receiver id fields 56, subject fields 58, and body fields 60. They also both include a conventional send button 62. The only difference between the send form 52a of FIG. 2a (conventional) and the send form 52b of FIG. 2b (modified) is that the latter also includes a send securely button 64. While it may be desirable in some embodiments to entirely replace the send button 62 with the send securely button 64, that is not anticipated to become common. The receive form 54 of FIG. 2c includes receiver id fields 56 (To: and Cc:), a subject field 58, a body field 60, and also a sender id field 66. Understanding the various fields in these forms will be helpful for the following discussion.

Figure 3:
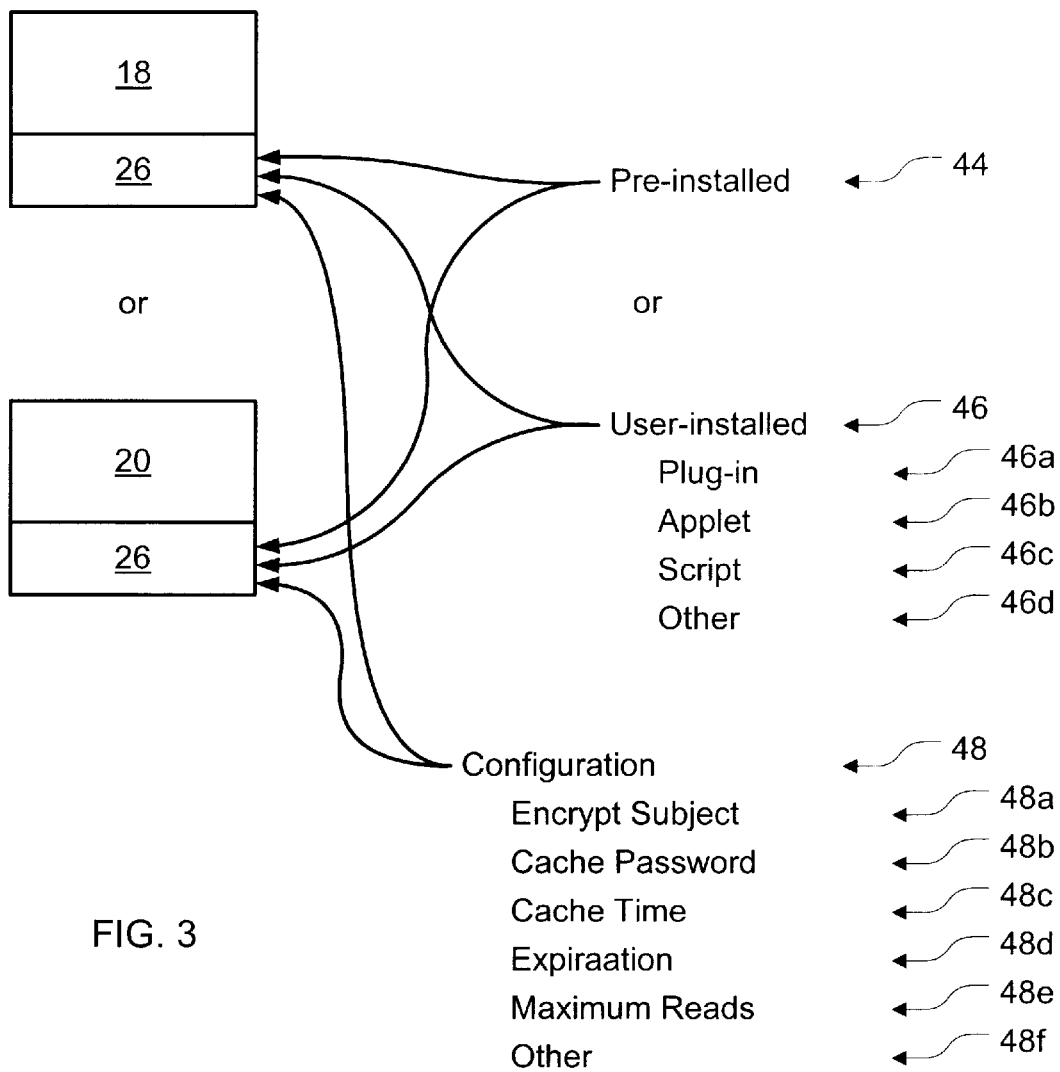
FIG. 3 is a block diagram depicting software modules which may be used by the invention in sending and receiving units.

FIG. 3 is a block diagram depicting the software modules 26 used in the sending unit 18 and receiving unit 20. In many embodiments of the invention the software modules 26 can be the same in both the sending unit 18 and the receiving unit 20, but this is not a requirement and different modules may also be used. The software modules 26 can be viewed as "client" side components of the secure e-mail system 10.

This figure also depicts various possible manners of installing the software modules 26 into the sending units 18 and receiving units 20. A pre-installed option 44 may be used whereby the underlying e-mail type application which is loaded onto a sending unit 18 or a receiving unit 20 comes with the software module 26 already included. Conventional e-mail specific applications or web-based e-mail applications may advantageously employ this pre-installed option 44.

Since a key goal of the secure e-mail system 10 is ease of use, employing it with web-based e-mail applications particularly facilitates operation by new users and simplifies operation by existing, sophisticated Internet users. Many Internet service providers (ISPs) today supply browser application software to their users. One example is America Online (AOL, TM), which provides its users with a pre-configured "private label" browser application. This pre-installed option 44 permits including the secure e-mail system 10 in the private label browser, and minimizes any set-up burden. Default settings can be set for any configuration options, and the senders 12 and receivers 16 can then optionally tailor the software modules 26 as desired.

Alternately, a user-installed option 46 may be used wherein the software modules 26 are installed by the senders 12 and receivers 16, i.e., the end users, into their respective sending units 18 and receiving units 20. This user-installed option 46 permits use of the secure e-mail system 10 by the large body of Internet users which do not use private label applications.

This user-installed option 46 may be implemented in many variations. One variation 46a is permanent installation of the software module 26 as a plug-in. Another variation 46b is transitory "installation" of the software module 26 as an applet upon each use of the secure e-mail system 10, e.g., a Java applet obtained by using a particular web portal such as Yahoo! (™). Still another variation 46c is a script driven installation, i.e., essentially a conventional full blown software application installation rather than a compartmentalized plug-in type installation. And yet other variations 46d are possible, say, combinations of those described or even new approaches to installation entirely.

These variations 46a–d may employ downloading from a closely controlled server, such as the security server 24 (FIG. 1). Alternately, some of these may involve distribution by other means, such as loading the software module 26 from a compact disc (CD). CDs are a common way that private label applications are distributed, particularly private label browsers. Rather than distribute an application with the software module 26 already installed according to the pre-installed option 44, an application distribution CD can simply include the software module 26 as an option which the user can decide to install via the user-installed option 46.

Obtaining the software module 26 online provides some peripheral advantages, however. The senders 12 and receivers 16 can formally become registered with the secure e-mail system 10 at the same time and they can comply with any other formalities, such as certifying that they are able to accept and use encryption technology.

The variations 46a–d, to different degrees, also may facilitate upgrade options. For example, every time a software module 26 contacts the security server 24 it can include version information as part of its communication. In sophisticated embodiments the software modules 26 may self-upgrade, from the security server 24 or elsewhere, as upgrades become available. In less sophisticated embodiments or where re-certification may be required, information can be sent regarding how to upgrade. For instance, an e-mail message including an upgrade site URL can be send to a sender 12 or receiver 16.

FIG. 3 also depicts some possible configuration options 48 which the senders 12 and receivers 16 may change in the software modules 26. Suitable defaults can be provided in most, if not all situations, but sophisticated users or particular situations may merit changing these settings. While such configuration options 48 generally should persist from session to session, consistent with good security practice they should be associated with a user and not merely with a machine. Thus, where multiple senders 12 or receivers 16 may use the same sending units 18 or receiving units 20, the users may be allowed to set independent personal configurations.

Particular examples of settings in the configuration options 48 may include: an encrypt subject setting 48a, a cache password setting 48b, a cache time setting 48c, an expiration setting 48d, a maximum reads setting 48e, and others 48f.

The encrypt subject setting 48a controls whether a software module 26 encrypts the subject field 58 (FIGS. 2a–c) as well as the body field 60 of the secure e-mail 14. The default typically will be to not encrypt the subject.

The cache password setting 48b permits specifying whether a password is required once per application session (e.g., per browser session), or whether a prompt requires the password every time it is needed. The default will generally be to cache the password but, as described next, this can work with a cache time setting 48c in a more secure manner. The password can also be cached only in memory and never to disk, for added security.

The cache time setting 48c works with the cache password setting 48b to control a maximum time which a password can be cached. Default and permitted maximum values for this might be 8 hours. A sender 12 could then shorten the cache time setting 48c, but not be allowed to lapse into poor security practices by specifying too high a time.

The expiration setting 48d allows a sender 12 to specify when the security server 24 (FIG. 1) should discard a message key, and thus make the secure e-mail 14 unreadable. The default will generally be to not explicitly force expiration, but after some substantially long period of time (perhaps years) the security servers 24 in most embodiments of the secure e-mail system 10 will probably need to do so.

The maximum reads setting 48e specifies the number of times that each receiver 16 can open and read a secure e-mail 14, i.e., the number of times that the message key will be sent to a single receiver 16. A default may be zero, meaning that there is no limit.

Of course, still other configuration options 48 may be provided, hence an others 48f element is present in FIG. 3 to emphasize this.

Once the software module 26 is installed in a sending unit 18 it is ready for use in message composition and send scenarios. A private label browser where the software module 26 is a plug-in type variation 46a will be used in the following discussion, but those skilled in the art will appreciate that the underlying principles are extendable, as well, to other systems which may use the secure e-mail system 10.

Figure 4:
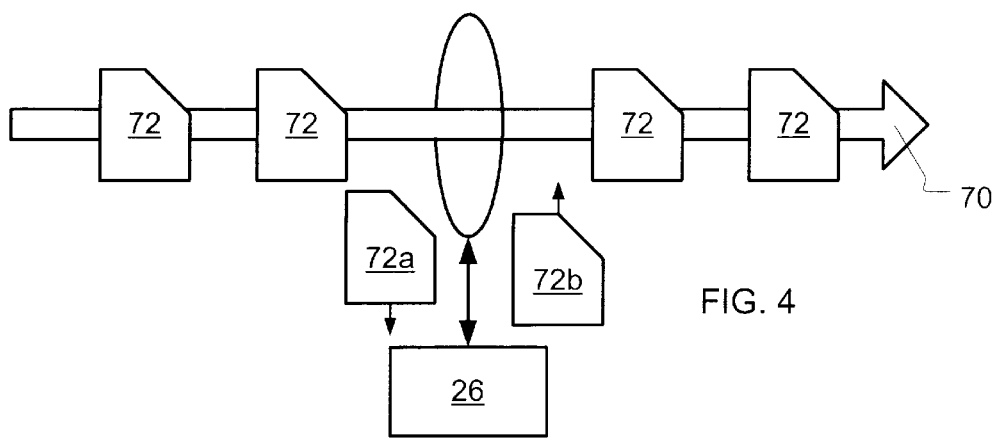
FIG. 4 is a block diagram stylistically depicting an approach for the software modules to determine whether a secure e-mail is being either sent or received.

FIG. 4 is a block diagram stylistically depicting a preferred approach for the software modules 26 to determine whether a secure e-mail 14 is being sent (or received). The software module 26 in the sending unit 18 examines a stream 70 of pages 72 looking for any which allow a sender 12 to compose a secure e-mail 14. One way to examine the stream 70 is for the software module 26 to see if the URL of a page 72 has a certain structure, e.g., "*mail.privatelabel.com*/Compose*" where * can match any pattern. Another way for the software module 26 to examine is to determine if the HTML content of a page 72 has a certain recognizable (static) pattern, e.g., the name of the form tag is "Compose." The software module 26 may also use MIME types to identify possible pages 72 to intercept. If an actual candidate page 72a is found it is removed from the stream 70, processed as now discussed, and replaced into the stream 70 as a processed page 72b.

Once the software module 26 determines that a page 72 about to be rendered is a composition type candidate page 72a, it needs to modify that candidate page 72a to include at least one new control, the send securely button 64 (FIG. 2b). Other controls in addition to this one button may be added if desired, but they are optional.

The send securely button 64 is "pressed" (operated, say, by a mouse click) by the sender 12 rather than their operating the conventional send button 62 when it is desired to send a secure e-mail 14. When the send securely button 64 is operated the software module 26 intercepts the page 72 (or form) containing the various fields of the e-mail which was about to be posted to the e-mail server 22, and modifies some of those fields. After this modification is complete the software module 26 executes the desired operation (post or send) exactly as would have happened had the sender 12 pressed the send button 62 in the first place. The only difference is that the values in some of the fields in the secure e-mail 14 will be now different, i.e., encrypted.

In the inventor's presently preferred embodiment only two fields are typically modified. The body field 60 is always modified by encrypting it. And depending on the configuration settings, specifically the encrypt subject setting 48a described above, the subject field 58 may also be changed.

Figure 5:
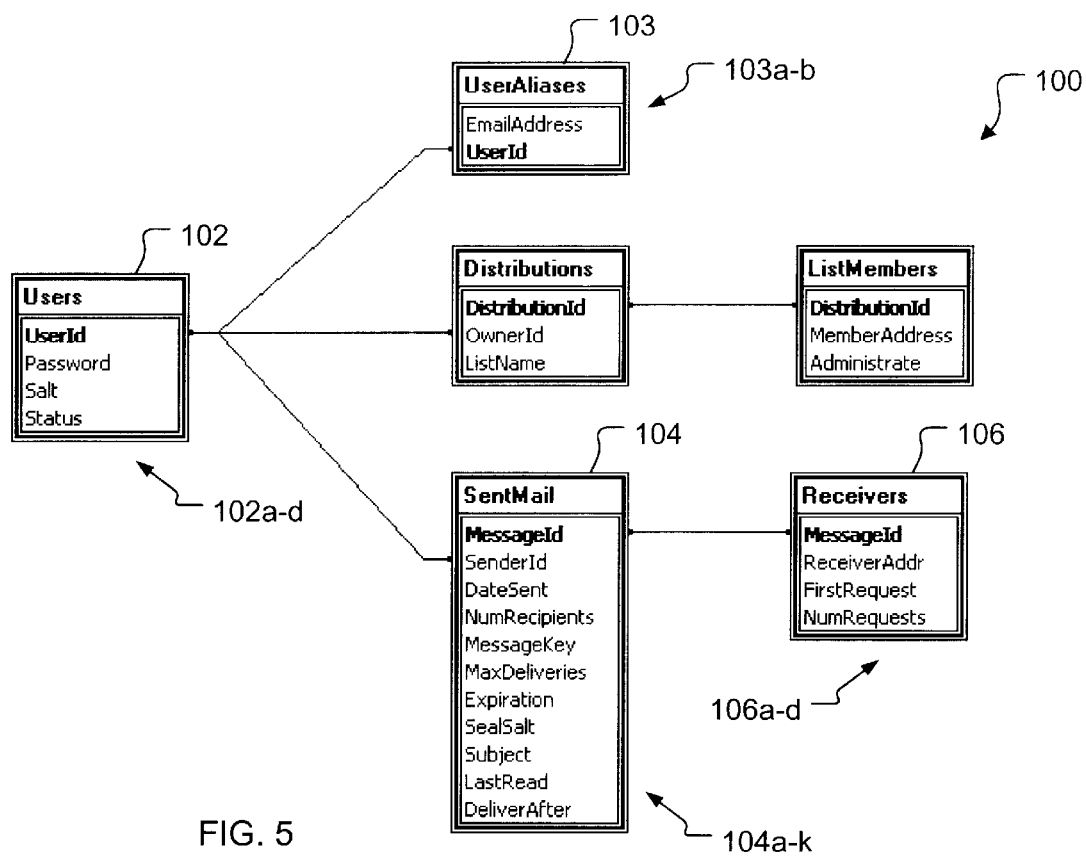
FIG. 5 is a diagram of a relational database including tables useable by the invention.

Before examining the processes of encryption and decryption, some discussion of the various data items used by the secure e-mail system 10 is appropriate. FIG. 5 is a diagram of a database 100 including tables used by the secure e-mail system 10. The primary component of the security server 24 (FIG. 1) is this database 100. The registered senders 12 and receivers 16 are collectively treated within the database 100 as users, and data for them is stored in a users table 102.

The users table 102 includes records each having fields for: a userId 102a, a password 102b (actually a hashed version of the actual password in the preferred embodiment, as presently described), a salt 102c, and a status 102d.

Closely related to the users table 102 is a user aliases table 103, which includes records each having fields for: an emailAddress 103a and a userId 103b (relationally linked to the userId 102a in the users table 102).

The database 100 also includes a sentMail table 104. This includes records each having fields for: a messageId 104a, a senderId 104b, a dateSent 104c, a numRecipients 104d, a messageKey 104e, a maxDeliveries 104f, an expiration 104g, a sealSalt 104h, a subject 104i, a lastRead 104j, and a deliverAfter 104k.

A receivers table 106 is provided as well. As can be seen in FIG. 5, the messageId 104a in the sentMail table 104 is relationally linked to a messageId 106a in the receivers table 106. Thus, this receivers table 106 contains data for the receivers 16 specified in respective secure e-mails 14. The receivers table 106 further includes records each having fields for: a receiverAddr 106b, a firstRequest 106c, and a numRequests 106d.

FIGS. 6a–f are tables of the data fields used by the preferred embodiment. The tables in FIGS. 6a–d are important to the core operation of the secure e-mail system 10, while the tables of FIGS. 6e–f relate to optional features of the secure e-mail system 10.

The text in the tables of FIGS. 6a–d describes some of the particular fields, with the primary fields discussed further presently. FIG. 6a is the users table 102 of FIG. 5. This contains data records for each user, sender 12 or receiver 16, which is registered with the secure e-mail system 10. As each user registers, they are assigned a UserId (userId 102a) and they choose a Password (password 102b) which are stored here. The preferred value of the Password (password 102b) is H(p+s) where p is the cleartext password and s is a salt (salt 102c) concatenated with the cleartext password. FIG. 6b is the sentMail table 104 of FIG. 5. This contains data records for each secure e-mail 14 in the secure e-mail system 10. FIG. 6c is the receivers table 106 of FIG. 5. This contains destination data for each secure e-mail 14 which is to be deliverable by the secure e-mail system 10. Since a record gets generated in this table for each receiver 16 (individual or list group) of each secure e-mail 14 that is sent, it is expected that this table will be the largest by far in the secure e-mail system 10. A null value in the FirstRequest field (firstRequest 106c) implies that the receiver 16 has not requested to read the secure e-mail 14. FIG. 6d is the user aliases table 103 of FIG. 5. This contains data for all known email addresses (emailAddress 103a) for each given user (userId 103b, relationally linked to userId 102a in the users table 102). Thus single users may be known by multiple email addresses, or aliases.

The fields of FIGS. 6e–f are not discussed further beyond the following. These tables are used by optional features, and the text in them provides sufficient detail such that one skilled in the art can appreciate the uses of these fields. FIG. 6e is a table of the data used to permit the use of e-mail distribution lists. This table allows the users to create distribution lists. An owner can always update the list, but the owner need not actually be a member of the list. This latter feature is particularly useful for list administrators. And FIG. 6f is a table of the data used to permit the use of the distribution lists. This table contains data about the members of each distribution list.

Of course, other tables and other fields for other data than this shown in FIG. 5 and FIGS. 6a–f are also possible, and some of the above fields may be optional and can be omitted in some embodiments of the secure e-mail system 10.

Before encryption of a message can take place the software module 26 must obtain a password for the sender 12. If the password is cached, and if the cache time setting 48c has not been exceeded, this step is satisfied. Otherwise, the software module 26 can display a dialog box which prompts the sender 12 to enter their password. Conventional password handling features can be provided, such as displaying the password only as asterisks and permitting the sender 12 to cancel to abort sending.

In the preferred embodiment the passwords of the senders 12 and the receivers 16 are not the passwords 102b stored in the users table 102. Instead, as a heightened security option, the user picks a password, and this and the salt 102c are hashed by the security server 24 to obtain the password 102b. The user's chosen password is communicated to the security server 24, where a hash of it and the salt 102c takes place and is stored as the password 102c in the database 100. The cleartext of the user's password is not stored at the security server 24, only a computed hash which cannot be computed without the original password.

In this manner the security server 24 never need know, or be able to know, the actual user's password. This option is discussed further, presently.

Once the password 102b is obtained, the software module 26 can perform the operations of encryption and actual sending. In general, the software module 26 sends a request to the security server 24 via secure socket layer (SSL) protocol to authenticate the sender 12 and to obtain back a messageKey 104e for use to encrypt the secure e-mail 14. The software module 26 then encrypts the body field 60 (and optionally also the subject field 58) of the message and the result is then separately encoded to create the secure e-mail 14.

The use of secure socket layer (SSL) was mentioned above. Since a goal of the present secure e-mail system 10 is ease of use, the inventor's preferred embodiment employs SSL. It is currently considered quite secure in the industry, being widely used in common browsers, and with the average Internet user today using it and not even being aware that they are doing so. It should be appreciated, however, that the use of SSL is not a requirement. Other security protocols may alternately be used.

These notations are now used in the following discussion:

| | |
|---|---|
| $K_m =$ | One-time, unique key associated with an email; |
| $P_s =$ | Sender's password; |
| $P_r =$ | Receiver's password; |
| $\{p\}_k =$ | p encrypted with key k; |
| $\{p\}_{ssl} =$ | p encrypted with the SSL session key; and |
| $H(p) =$ | One-way hash of p. |

Figure 7:
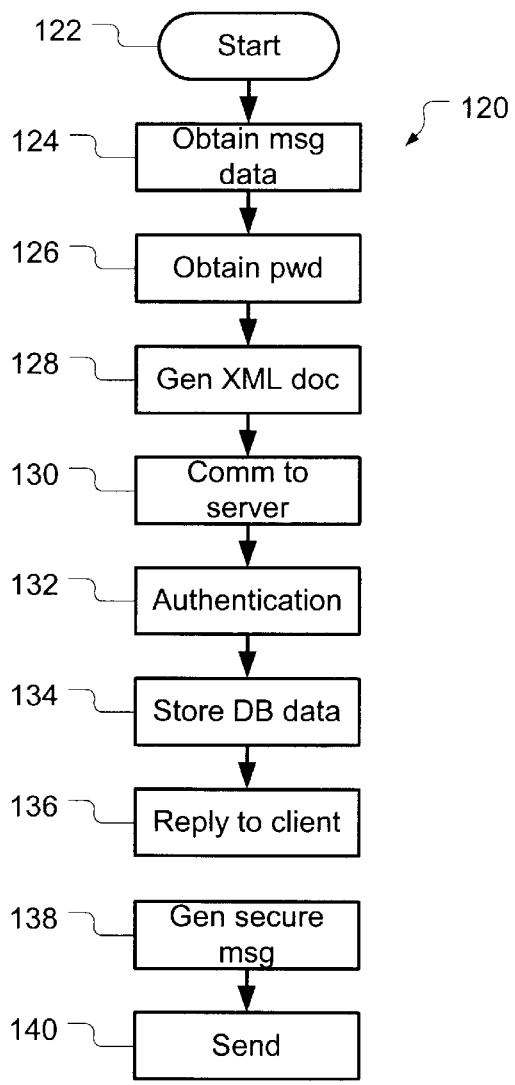
FIG. 7 is a flow chart depicting an encryption process according to the invention.

FIG. 7 is a flow chart depicting the presently preferred encryption process 120. At the time the sender 12 is ready to send a secure e-mail 14, an HTML send form 52b (FIG. 2b) is present with plaintext in the body field 60. It is assumed here that the sender 12 has already registered with the security server 24 and that an appropriate software module 26 has been installed into their browser. It is also assumed that the sender 12 is using only a browser to send the secure e-mail 14. The security aspects should be the same regardless of the actual mail client used, and this is used to keep the following explanation simple.

As described previously, the sender 12 selects the send securely button 64 on the send form 52b when they are ready to post. This constitutes a step 122, the start of the encryption process 120.

In a step 124, a script runs which passes the following information to the software module 26 in the sending unit 18:

the email address of the sender 12 (emailAddress 103a);

the contents of the To:, CC:, and BCC: fields (instances of receiverAddr 106b);

the contents of the subject field 58; and the contents of the body field 60.

In a step 126, if the software module 26 did not already know the password for the sender 12 it prompts for it. It is a matter of security policy choice whether to require the password to be entered on each send, since this could be unduly cumbersome in some cases. Caching the user's password, and thus also the password 102b, in the software module 26 may be insecure if the sender 12 leaves the browser session open. While the policy will often be to allow the sender 12 to choose how to configure this option, there will also be some cases, e.g., at public kiosks, where it should always be required that a password be entered for each secure e-mail 14.

In a step 128 the software module 26 creates an XML document in the following format, which will be the one encrypted:

<?xml version="1.0" encoding="ASCII"/>
<emailPart random="randomNum" length="numChars" mic="messageIntegrityCode">
<subject>subject</subject>
<body>body</body>
</emailPart>.

Here the random element is an anti-cracking feature, it is a large random number used to ensure that even e-mails that are the same in content are not the same when secured; the length element is the number of characters in the body field 60; the mic element is a message integrity code created by taking a hash of the body field 60; the subject element is the contents of the subject field 58; and the body element is the contents of the body field 60.

In a step 130 the software module 26 opens an SSL HTTP (HTTPS) connection to the security server 24, and sends it the following information:

- the emailAddress 103a of the sender 12;
- the password 102b for the sender 12;
- a list of target receivers 16 (receiverAddr 106b, and implicitly numRecipients 104d);
- the subject field 58 of the message (subject 104i);
- a list of computed hashes, one for the body, H(b), and one for each attachment, $H(a_1)$, $H(a_2)$ ... $H(a_n)$; and
- optional configuration information such as an expiration time or maximum number of deliveries allowed per recipient.

In a step 132 the security server 24 proceeds depending on the result of an authentication sub-process.

1) If the emailAddress 103a for the sender 12 is unknown the encryption process 120 can determine a known email-Address 103a or stop. The emailAddress 103a might be unknown for various reasons. One common example will be that the sender 12 is new to the security server 24. In this case the software module 26 can be directed to open a separate browsing window which allows the sender 12 to register on the spot. Another reason that the emailAddress 103a can be unknown is due to a user error. One simple source of such errors can be that multiple users share the same browser. A sender 12 can then be requested to clarify their identity.

2) If the password 102b of the sender 12 is incorrect the software module 26 can be instructed to prompt for the password 102b again (perhaps only a limited number of times), or let the sender 12 abort their sending operation (which returns them back to the original HTML send form 52b).

3) If the sender 12 is not allowed to send secure e-mails 14 the encryption process 120 can also stop. This can be for administrative reasons. For example, if the sender 12 has not paid a fee or if there is a court order preventing a user from using this encryption service, etc. The reason for a denial can be stated in a dialog box which, when acknowledged, can return the user to the original HTML send form 52b (perhaps to instead use the send button 62, and to send the message as a conventional e-mail).

Otherwise, the sender 12 is considered to be authenticated and is allowed to send the presently contemplated secure e-mail 14, and this step 132 is successfully complete.

In a step 134 the security server 24 then creates and populates a record in the sentMail table 104. In particular, unique values are generated here for a messageId 104a (m), a messageKey 104e ($K_m$), and a list of computed seals (sList) for each part of the secure e-mail 14 being sent. The security server 24 computes the seals in sList as $H(H(H(x)+s+t+m+N_m)+N_m)$. The element s is userId 102a of the sender 12; t is the date and time (also stored as dateSent 104c in the sentMail table 104); m is the messageId 104a; $N_m$ is the sealSalt 104h (a random number generated for this particular secure e-mail 14, but separate from the messageKey 104e); and H(x) is from the set of hashes H(b), $H(a_1)$, $H(a_2)$ ... $H(a_n)$ received from the software module 26. Note, the contents of sList need not be stored, since they should be re-computable.

In a step 136 the security server 24 responds back to the software module 26 of the sending unit 18 with an SSL packet information in the form $\{m, K_m, sList\}_{SSL}$.

In a step 138 the software module 26 extracts the messageId 104a (m), the messageKey 104e ($K_m$), and the seals from sList, and proceeds to encrypt the above XML document and each attachment with the messageKey 104e. The software module 26 then destroys that key from memory in the sending unit 18. Specifically, the software module 26 creates a message form having the following general format:

```
------ BEGIN SECURECORP SECURED EMAIL ------
<securecorp:messagePart id="m">
<encryptedPart>encrypted body</encryptedPart>
<seal>seal</seal>
</securecorp:messagePart>
------ END SECURECORP SECURED EMAIL ------
```

If this part of the secure e-mail 14 includes an encrypted body, this is converted from a raw bit stream (post encryption) to an encoded stream so that the encrypted body element is composed of rows of printable (ASCII) characters. If this is an attachment that is not necessary.

Finally, in a step 140 the software module 26 performs the exact same action as if the sender 12 had pressed the send button 62 in the send form 52b in the first place. It posts to the e-mail server 22 (perhaps via an e-mail capable web server, e.g., Yahoo!(™), Hotmail(™), etc.). The difference is that the value in the body field 60 of the form being posted is now encrypted and encoded as described above. Similarly, any attachments are encrypted as described above. From the point of view of a conventional e-mail server 22 or a web server, the result looks like a normal e-mail message whose body is just a bunch of gibberish. The secure e-mail 14 can then travel through the normal Internet mail system to arrive at its various destinations.

Attachments were not covered in much detail in the above discussion, but they can easily be handled as well. In the preferred embodiment attachments are each treated much like a body field 60, except that they are not wrapped in XML or encoded (turned into ASCII). Instead a binary header is added which includes protocol version information; a new length element, like that for the body; a copy of the same messageId 104a used for the body of the secure e-mail 14; a new mic element created by taking a hash of the attachment body; and a seal (as discussed for sList, above). The attachment is then encrypted using the same messageKey 104e as was used for the body of the secure e-mail 14 the header is added to it, and the result is uploaded to the e-mail server 22 in the usual manner.

This approach for attachments has a number of advantages. The database 100 of the security server 24 need not be disturbed by this approach to handling attachments, since the verification mechanism for them is thus carried within the secure e-mail 14 and is protected by the security features applicable there. This can also support any number of attachments. Each attachment is added to the object which will be passed into the software module 26 which does the encryption. Each attachment is encrypted using the same messageKey 104e as the body of a message, and the hash of each attachment can be computed using the same algorithm. By giving each attachment a full header it can be decrypted separately from any other attachment or even from the body. By separating the attachments it can also be determined if any particular attachment has been altered. The normal operations on the rest of a secure e-mail 14 can be performed even if the attachments are purposely not included, e.g., when replying to a secure e-mail 14 having attachments.

As noted above, the secure e-mail 14 travels through the normal e-mail system to the inbox of each receiver 16. The receivers 16 can typically go to a screen in their browsers where a summary of all messages that have been received is presented. By clicking on a message summary the browser can then deliver a page formatted with the message in it. This, however, requires that a suitable software module 26 is present.

Once a software module 26 is installed in the receiving unit 20 it is ready for use in message receive and read scenarios. A private label browser where the software module 26 is a plug-in variation 46a is also used in the following discussion, but those skilled in the art will here also readily recognize that the underlying principles are extendable to other systems using the secure e-mail system 10.

Returning briefly to FIG. 4, this also stylistically depicts the preferred approach for the software modules 26 to determine whether a secure e-mail 14 is being received. The software module 26 in the receiving unit 20 examines the stream 70 of pages 72 looking for any which contain a secure e-mail 14. The software module 26 can determine whether a page 72 contains a secure e-mail 14 by scanning for "------ BEGIN SECURECORP SECURED EMAIL ------" type tags. This can be done quickly, permitting minimal latency in delivering pages which should not be processed further. If an actual candidate page 72a is found it is removed from the stream 70, processed as now discussed, and replaced into the stream 70 as a processed page 72b, and thus made available for reading by the receiver 16.

Figure 8:
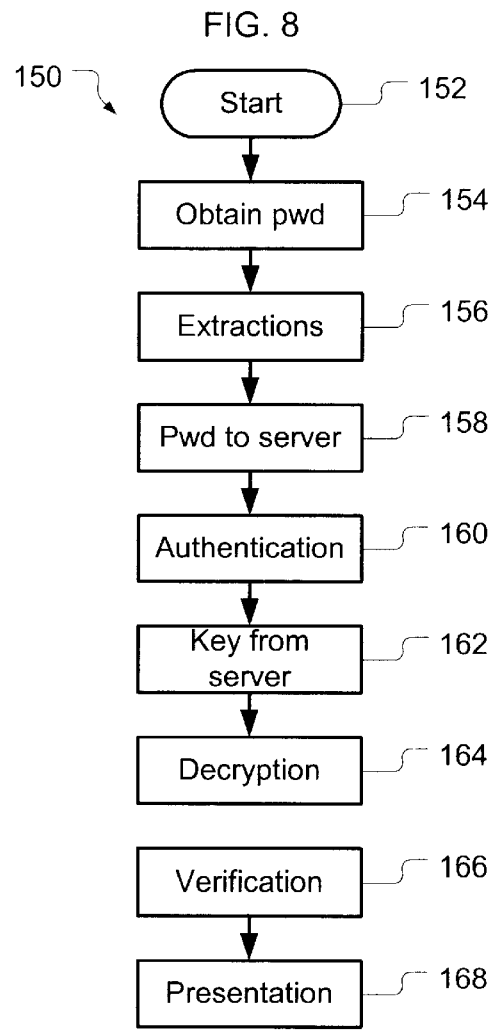
FIG. 8 is a flow chart depicting a decryption process according to the present invention.

FIG. 8 is a flow chart depicting the presently preferred decryption process 150. It is here also assumed that the software module 26 has already been installed within a browser running on the receiving unit 20 of a receiver 16, and that the receiver 16 has registered with the security server 24 (the security server 24 perhaps having already generated an e-mail to any receivers 16 not previously registered). Once a secure e-mail 14 (i.e., a secured and sealed XML document created according to the encryption process 120) is selected by the receiver 16, the software module 26 performs the operations of decryption to permit reading of the secure e-mail 14 by its receiver 16. This constitutes a step 152, the start of the decryption process 150.

In a step 154 the password for the receiver 16 is obtained. Recall that both the senders 12 and the receivers 16 are treated as users by the security server 24, and both have equivalent entries in the users table 102 (FIG. 5). If the password 102b is not already cached, the receiver 16 is prompted to enter their password. The rules for password caching, prompting, etc. may be the same as for sending.

In a step 156 the software module 26 extracts the messageId 104a, decodes (if encoded) the received message and extracts the body field 60 (still encrypted).

In a step 158 the following information is then sent to the security server 24 (via SSL):
the email address of the receiver 16 (emailAddress 103a);
the password 102b of the receiver 16; and
the messageId 104a.

In a step 160 the security server 24 proceeds depending on the result of an authentication sub-process.

1) The security server 24 hashes the receiver's password with the password salt 102d to determine the password 102b.

2) The password 102b is verified, based in part on association with the emailAddress 103a of the receiver 16. If this part of the authentication fails, the response to the software module 26 results in the receiver 16 being prompted for the correct password 102b or the decryption process 150 aborting.

3) It is determined whether the receiver 16 is authorized to read the present secure e-mail 14. For this, the email address of the receiver 16 must match the receiverAddr 106b in the receivers table 106 for the particular messageId 106a, the numRequests 106d must be less than the maxDeliveries 104f for this secure e-mail 14, and the expiration 104g must not indicate that the message has already expired. If this authorization fails, the response to the software module 26 results in notifying the receiver 16 and then exiting the decryption process 150 without decrypting the secure e-mail 14.

Note, if either of these tests fail the browser page can simply display as if it does not contain encrypted material, i.e., as unintelligible gibberish where the body field 60 would normally be. The sender id field 66, the various receiver id fields 56, and possibly also the subject field 58 (depending upon configuration) can still be intelligible, however. The receiver 16 may thus be able to contact the sender 12 or any other receivers 16 to determine if the secure e-mail 14 was important and if measures outside the secure e-mail system 10 are appropriate. If these tests are successful, the receiver 16 is considered to be authenticated and this step 160 is complete.

In a step 162 the security server 24 sends the messageKey 104e back to the software module 26 of the receiver 16 via SSL.

In a step 164 the software module 26 decrypts the secure e-mail 14, using this same messageKey 104e and the reverse of the basic process as was used to encrypt it.

In a step 166 the software module 26 validates the secure e-mail 14. This involves a second round of communications with the security server 24. The software module 26 generates new hashes of each part of the secure e-mail 14 and sends these and the seals included in each message part to the security server 24. The security server 24 then computes new seals, based on the passed in hashes, which it compares with the passed in seals. If there are any differences, this is an indication that the secure e-mail 14 is not authentic. The security server 24 then sends an indication about the authenticity of the secure e-mail 14 back to the software module 26.

Finally, in a step 168 an HTML receive form 54 is presented to the receiver 16 showing the plaintext body field 60 of the secure e-mail 14 where the encrypted message used to be. Further, if the indication about authenticity from the security server 24 was negative, the software module 26 presents a message advising the receiver 16 in this regard as well.

Also in the preferred embodiment, as an optimization of in the decryption process 150 the software module 26 caches the message key 104e so that the same message can be read again within the same session without accessing the security server 24. However, this is only for read operations and the message key 104e is never stored on disk.

Decryption of any attachment is simply performed using the same messageKey 104e and the same basic process. The only differences are that a binary header is used, as described earlier, and the information in an attachment is not encoded.

In summary, the software modules 26 of the preferred embodiment should: intercept and parse HTML pages before they are rendered; selectively modify HTML pages before they are rendered; extract data from HTML forms and pages; send data to a security server via a secure means (e.g., secure HTTP, SSL); perform symmetric key encryption and decryption using the same algorithm for both actions (e.g., Blowfish symmetric key encryption/decryption); perform hashing (e.g., secured hash algorithm one, SHA-1); display dialog boxes (for password entry, configuration, error messages, and seal verification results); and, preferably, be able to self-upgrade.

The security features underlying the preceding encryption process 120 and decryption process 150 bear some further analysis. For authentication purposes, the operator of the security server 24 knows the sender 12 because their emailAddress 103*a* should associate with their password 102*b*. If the password 102*b* is treated the way it is supposed to be, i.e., only the holder should know it, then the operator of the security server 24 can be sure that only the sender 12 could have sent a particular secure e-mail 14. But the sender 12 does not necessarily even have to be trusted. By storing the sealSalt 104*h* initially, it is also possible for the operator of the security server 24 to be sure that no one, including the sender 12, can alter a secure e-mail 14 after it is sent. As an added security feature the sealSalt 104*h* may be stored encrypted in the database 100, and then never shared and never allowed to leave the security server 24. By encrypting the hashes of the body and attachments (H(b), H(a)) with the SSL key after the sender 12 has been authenticated (by providing the password 102*b*) it is possible to determine that it is the sender 12 who is signing their secure e-mail 14. Because the security server 24 stores only a hash of the actual password of the sender 12 as the password 102*b,* there is no way even the operator of the security server 24 can falsely sign a secure e-mail 14 on behalf of the sender 12.

Because the messageKey 104*e* is symmetric and because an outside entity is storing it, i.e., the security server 24, it is possible for someone to decrypt a secure e-mail 14 if they have intercepted both the secure e-mail 14 and also obtained its messageKey 104*e*, say, by breaking into the database 100. Interestingly, just having one or the other here does not do any good. This can be even further strengthened by encrypting the messageKey 104*e* with a public key. Then, breaking into the database 100 still does not help, since one would need the appropriate private key to be able to obtain the messageKey 104*e* needed to crack any given secure e-mail 14. A brute force attack on the database 100 therefore becomes infeasible. Also, to the extent possible, the operators of the security server 24 can put the necessary private key into actual hardware, making it virtually impossible to break into the database 100 without physical access to the actual machines being employed.

Reading a secure e-mail 14 is simpler than sending it. The only concern is that there is a single key per message (messageKey 104*e*) used for decryption. Therefore there is a moment within the software module 26 where that key is in the clear on the receiver's machine and it is possible to access it. However, all that permits is reading the current secure e-mail 14 which the receiver 16 is allowed to read anyway. Hence, there is only a risk here if an unauthorized person can gain access to the key for the brief time that it is in memory. This would be extremely difficult, and it follows that, if the key could be stolen in this fashion, the decrypted message could just as easily (if not more so) also be stolen. So why bother with the key? In sum, this is not much, if any, of a security risk.

The use of the seal provides for non-repudiation via the operator of the security server 24 acting as a trusted thirdparty notary. In particular, a judge can determine whether a message was actually sent from a sender 12 by giving the operator of the security server 24 the seal, the hash of the message and the name (to map to the userId 102*a*) of the sender 12. As was described for the preferred embodiment, a receiver 16 can verify that a seal is genuine (which proves that the sender 12 actually wrote and sent a particular secure e-mail 14), by sending the seal and a hash of the body of the received message to the security server 24. The security server 24 can then provide an assurance in this regard. The seal is used at the security server 24 to determine whether it is genuine by re-computing it based on the three known quantities. This technique is known as "non-repudiation with secret keys" and is taught by Kaufman et al. in "Network Security: Private Communication in a Public World," Prentice-Hall, 1995, pp. 343–44.

Obviously, much of the security in the embodiments described here is also based on the strength of SSL. Currently, this seems to be an accepted standard, so we will not concern ourselves here with the fact that both the password 102*b* of the sender 12 and the messageKey 104*e* are sent over it. However, the strength of the security of the secure e-mail system 10 is not dependent on SSL. As more secure protocols for protecting a communications channel become available (e.g., Transport Layer Security or TLS), the invention can easily use such a protocol.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

INDUSTRIAL APPLICABILITY

The present secure e-mail system 10 is well suited for application in current network environments such as the Internet. The Internet, in particular, has been widely regarded as a wild frontier, largely untamed and unregulated, and where one should proceed with caution. It is also widely considered to be an environment where rapid change, limited understanding, and poor implementations of technology have left even those presumably best prepared at risk. Regardless of the extent to which these concerns are actually true, it is incontestable that there is an existing and growing crises of confidence when it comes to the security of communications via the Internet. The present invention particularly addresses one key segment of such network communications, e-mail security.

The secure e-mail system 10 provides e-mail security which is extremely easy to use. A sender 12 may employ the system simply by registering and running a software module 26 on whatever sending unit 18 they may be using, e.g., personal computer, Internet appliance, etc. The software module 26 may be provided as a pre-installed option 44, present in their dedicated e-mail application, an e-mail enabled browser, or an e-mail portal accessible via a webbrowser. Alternately, the software module 26 may be provided as a user-installed option 46, wherein installation may be as a plug-in to the e-mail application, as a scripted modification of such an application, or even simply as an applet. In particular, running the software module 26 as an applet is minimally burdensome and it is actually somewhat of a misnomer to term this "installation."

The secure e-mail system 10 is similarly easy to use by receivers 16 of its secure e-mails 14, not even requiring that they be pre-registered. A sender 12 may send a secure e-mail 14 to one or an entire list of receivers 16, and the invention can automatically handle determining which particular receivers 16 are already registered and which will need to register to read a secure e-mail 14. The invention can then advise unregistered receivers 16 that they will be receiving a message that requires registration and a variation of the software module 26 (which again may be as minimally intrusive as an applet). The secure e-mail 14 goes directly to the inboxes of its receivers 16, and it is left to the receiver 16 (and any expiration instructions of the sender 12) to determine when and if the secure e-mail 14 can be decrypted and read.

The secure e-mail system 10 notably overcomes user complexities of prior art systems. The major security element is a simple user password 102b. This simplicity is in marked contrast to the predominant current public-private key scheme, wherein senders and receivers must resort to directories of one another's certified public keys, and all parties must be pre-registered and present in such directories (plural, because there are a number of competing operators of such systems). The currently predominant scheme is also not well liked because of reasons beyond its initial set-up burden. It uses complex keys, often having hundreds of digits, and thus not able to be memorized and usable away from a system which has some means to access such complex pre-stored keys. For example, the only practical way to use a public-private key system at public kiosks is for users to employ a hardware aid for key storage, such as a smart card. The secure e-mail system 10 does not require hardware aids (although it may optionally use such), and it does not necessarily "tether" its users to only a few pre-set systems.

The secure e-mail system 10 is also easily and economically implementable in the currently existing Internet environment. It employs little or no materials (since the security server 24 may even be incorporated onto other server hardware), and constructing embodiments of the invention is within the range of skills of many currently practicing in the software and communications arts. It also, notably, requires no changes in the underlying Internet environment in which it may work. Between the senders 12 and the receivers 16 the secure e-mails 14 of the present invention appear and are handled essentially as conventional e-mails, traveling via conventional routes and using a standard e-mail server 22. Within the Internet environment, only the security server 24 of the invention is added, and it (as contrasted to the data it "serves") appears as merely another server operating in this environment.

For the above, and other, reasons, it is expected that the secure e-mail system 10 of the present invention will have widespread industrial applicability. Therefore, it is expected that the commercial utility of the present invention will be extensive and long lasting.

What is claimed is:

1. A method for sending a secure e-mail, comprising the steps of:
   (a) composing an e-mail message by a sender, wherein said e-mail message includes a body field and at least one receiver field containing at least one receiver id representing at least one intended receiver;
   (b) providing from said sender a sender id, a sender password, and all said receiver ids to a security server;
   (c) receiving at said sender a message key and a message id which is unique for said e-mail message from said security server;
   (d) encrypting said body field of said e-mail message based on said message key and enclosing said message id therewith to form the secure e-mail at said sender;
   (e) mailing said secure e-mail to said receivers, wherein said secure e-mail itself is not communicated to or via said security server; and
   (f) storing said message id, said message key, and all said receiver ids at said security server, to allow said security server to provide said message key to said receivers so that they may decrypt the secure e-mail.

2. The method of claim 1, wherein:
   in said step (a) said e-mail message further includes a subject field; and
   said step (d) includes encrypting said subject field.

3. The method of claim 1, wherein said sender id is associated with an e-mail address for said sender.

4. The method of claim 1, wherein said sender password is derived from a private password provided by said sender, to permit said sender to maintain said private password as private.

5. The method of claim 1, wherein said sender password has been previously stored for said sender.

6. The method of claim 1, further comprising authenticating said sender based on said sender id and said sender password after said step (b) and prior to proceeding with said step (c).

7. The method of claim 1, wherein said step (d) encrypts using a symmetric key encryption algorithm.

8. The method of claim 1, wherein:
   said step (e) includes mailing to at least one said receiver which is in a receiver list; and the method further comprising:
   resolving said receiver list into a plurality of said receiver ids for said security server, to allow said security server to provide said message key to instances of said receivers which are members of said receiver list.

9. The method of claim 1, further comprising:
   said step (b) includes providing a message hash based on said e-mail message to said security server; and
   said step (c) includes receiving a first message seal from said security server based on said message hash; and
   said step (d) includes enclosing the first message seal with the secure e-mail, to permit said security server comparing said first message seal with a second message seal taken from the secure e-mail as received to determine whether the secure e-mail has been altered while in transit to said receiver.

10. The method of claim 1, wherein at least one of said steps (b) and (c) employs secure socket layer protocol in communications with said security server.

11. A method for receiving a secure e-mail, comprising the steps of:
   (a) accepting the secure e-mail by a receiver, wherein the secure e-mail includes a body field that is encrypted and a message id that uniquely identifies the secure e-mail;
   (b) providing said message id as well as a receiver id and a receiver password for said receiver from said receiver to a security server;
   (c) receiving a message key from said security server at said receiver; and
   (d) decrypting the secure e-mail at said receiver based on said message key, to form an e-mail message which is readable.

12. The method of claim 11, wherein:
   in said step (a) said secure e-mail further includes a subject field that is also encrypted; and
   said step (d) includes decrypting said subject field.

13. The method of claim 11, wherein said receiver id is associated with an e-mail address for said receiver.

14. The method of claim 11, wherein said receiver password is derived from a private password provided by said receiver, to permit said receiver to maintain said private password as private.

15. The method of claim 11, wherein said receiver password has been previously stored for said receiver.

16. The method of claim 11, further comprising authenticating said receiver based on said receiver id and said receiver password after said step (b) and prior to proceeding with said step (c).

17. The method of claim 11, wherein said step (d) decrypts using a symmetric key decryption algorithm.

18. The method of claim 11, wherein:
   the secure e-mail is sent by a sender and a first message seal based on the secure e-mail before it left control of said sender is stored by said security server;
   said step (b) further includes also providing to said security server a second message seal which is taken from the secure e-mail as received by said receiver; and
   said step (c) includes receiving an indication from said security server whether said first message seal and said second message seal match, to determine whether the secure e-mail was altered in transit.

19. The method of claim 11, wherein at least one of said steps (b) and (c) employs secure socket layer protocol in communications with said security service.

20. A system for communicating an e-mail message securely between a sender and a receiver, the system comprising:
   a sending unit that composes the e-mail message for the sender, wherein the e-mail message includes a body field and a receiver field containing a receiver id representing the receiver;
   said sending unit including a logic that provides a sender id, a sender password, and said receiver id to a security server;
   said security server including a logic that replies to said sending unit with a message id, which is unique for the e-mail message, and a message key;
   said security server further including a logic that stores said message id, said message key, and said receiver id;
   said sending unit further including a logic that encrypts the e-mail message based on said message key and encloses said message id therewith to form a secure e-mail;
   said sending unit yet further including a logic that e-mails said secure e-mail to the receiver, wherein said secure e-mail itself is not communicated to or via said security server;
   a receiving unit that accepts said secure e-mail;
   said receiving unit including a logic that provides said message id, said receiver id and a receiver password to said security server;
   said security server yet further including a logic that replies to said receiving unit with said message key for said secure e-mail; and
   said security server still further including a logic that decrypts secure e-mails based on said message key into the e-mail message such that it is readable by the receiver.

* * * * *